Dec. 5, 1967  R. S. ZEBARTH ETAL  3,356,422
POULTRY GIBLET CONVEYOR SYSTEM
Filed July 28, 1966  3 Sheets-Sheet 1
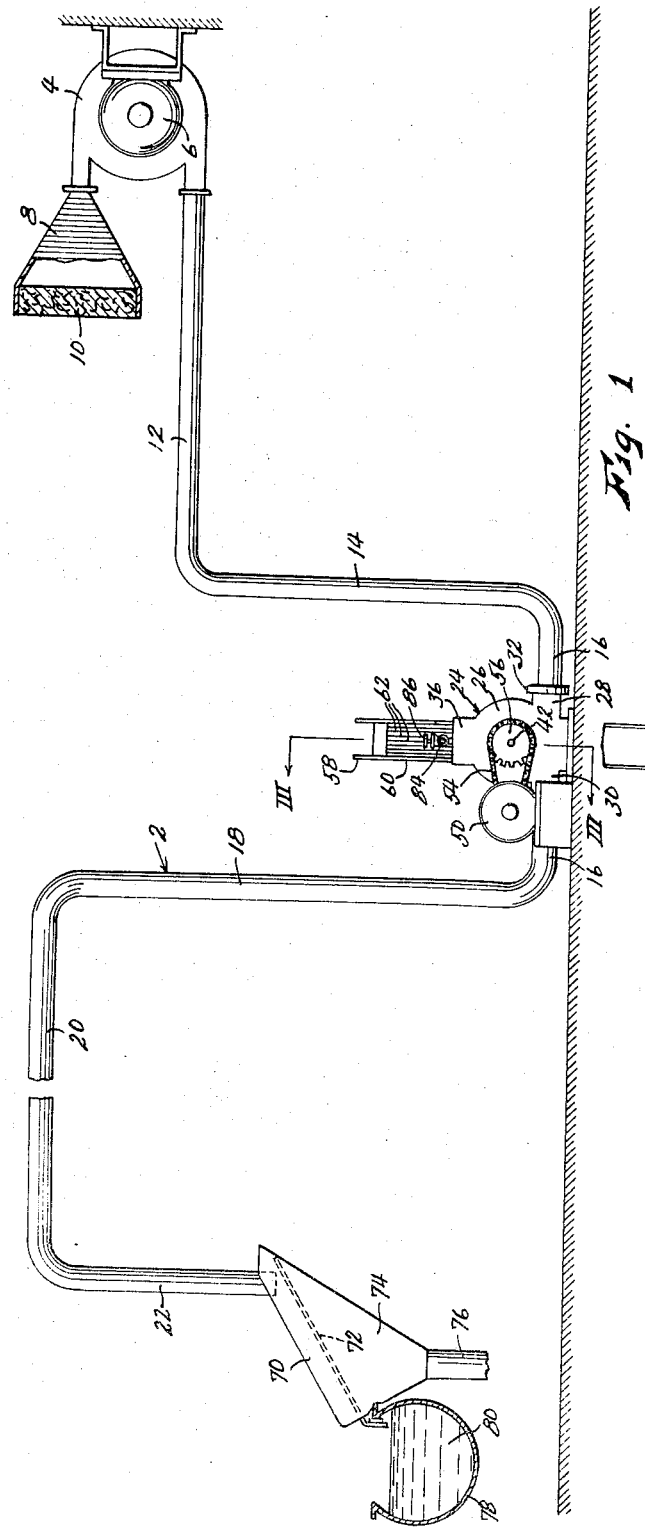
INVENTORS.
Ralph S. Zebarth
Drexel T. Carlson
BY John A. Hamilton
Attorney.

Dec. 5, 1967   R. S. ZEBARTH ETAL   3,356,422
POULTRY GIBLET CONVEYOR SYSTEM
Filed July 28, 1966   3 Sheets-Sheet 2

INVENTORS.
Ralph S. Zebarth
Drexel T. Carlson
BY John A. Hamilton
Attorney.

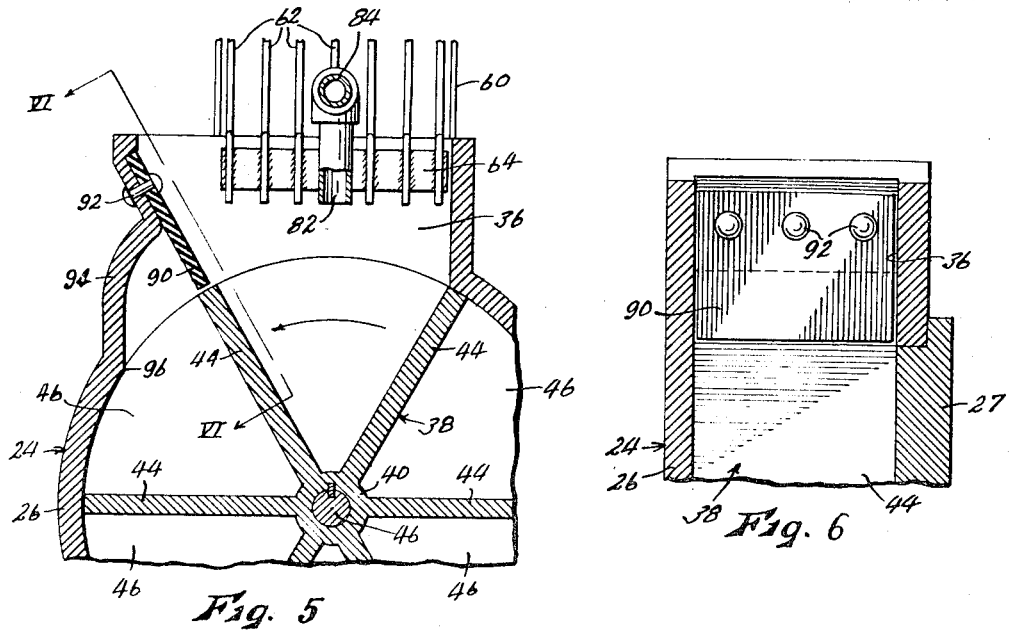
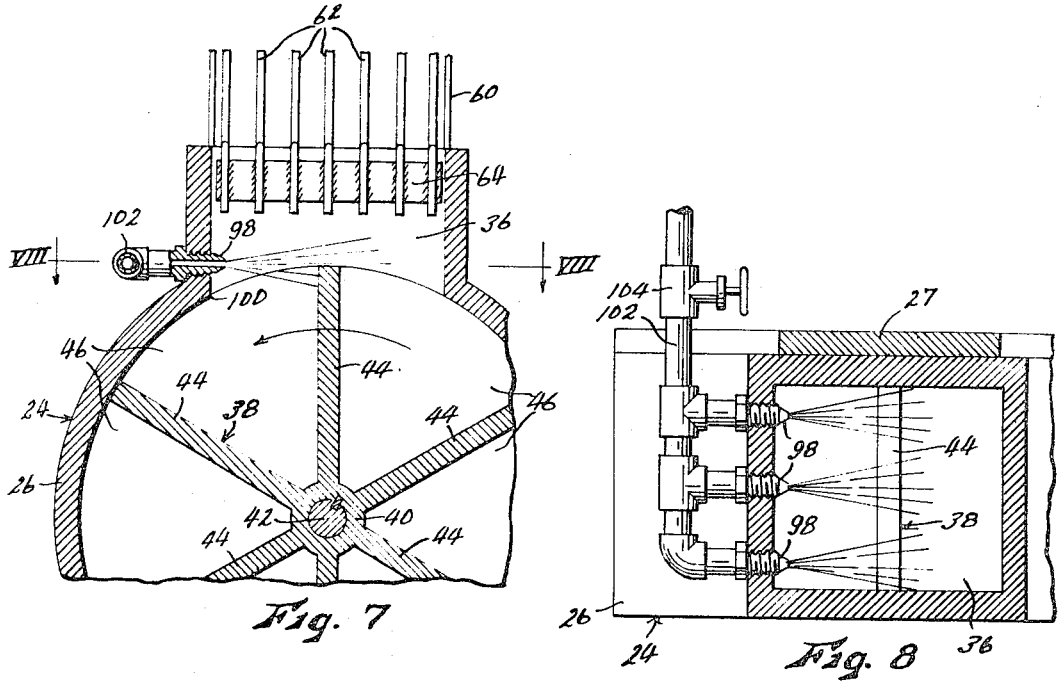

ID
3,356,422
POULTRY GIBLET CONVEYOR SYSTEM
Ralph S. Zebarth, Kansas City, Mo., and Drexel T. Carlson, Leawood, Kans., assignors to Ralph Zebarth, Inc., Kansas City, Mo., a corporation of Missouri
Filed July 28, 1966, Ser. No. 568,657
9 Claims. (Cl. 302—49)

This invention relates to new and useful improvements in conveyor systems, and has particular reference to a conveyor system especially adapted to transport poultry giblets from one station to another in poultry processing plants.

In such plants, the giblets, consisting usually of the hearts, gizzards and livers, are harvested on the conveyor line on which the evisceration of the birds is performed, but must be transported to another location in the plant, often a considerable distance from the evisceration line, for further treatment such as chilling, sorting, packaging and freezing. The principal object of the present invention is, therefore, the provision of a conveyor system which will transport the giblets from the evisceration line to any other desired station at a high speed so as to avoid possible spoilage, and in completely closed conduits, so as to avoid possible outside contamination.

Another object is the provision of a giblet conveyor of the character described which is further adapted to serve as a means for washing and cleaning the giblets. To this end, the system provides that the giblets will be drained prior to introduction thereof to the conveyor to rid it of much of the blood and other body fluids normally entrained therewith, intermixed with fresh, clean water as it is introduced to the conveyor, subjected to agitation in said water during the conveyance thereof, and again drained as it emerges from the conveyor and before it is subjected to the next step in the processing thereof.

Other objects are simplicity and economy of construction, efficiency and dependability of operation, economy and convenience of operation, and extreme flexibility of application for use in a wide variety of circumstances.

Figure 4:
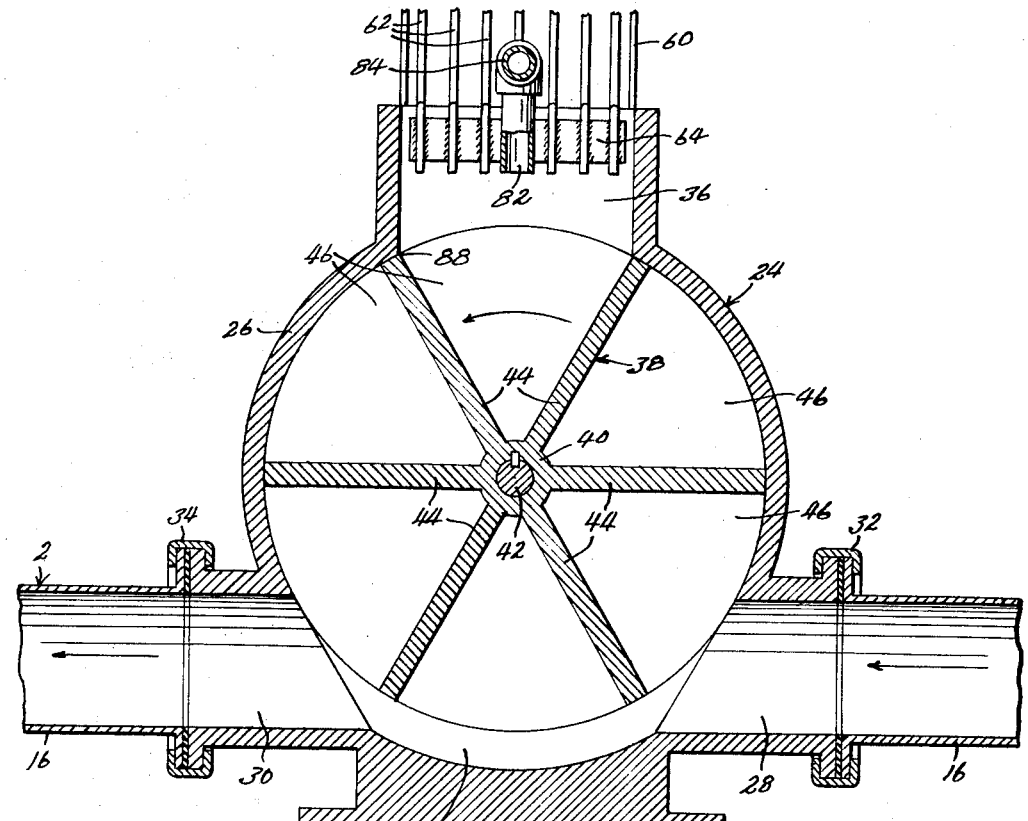
Figure 3:
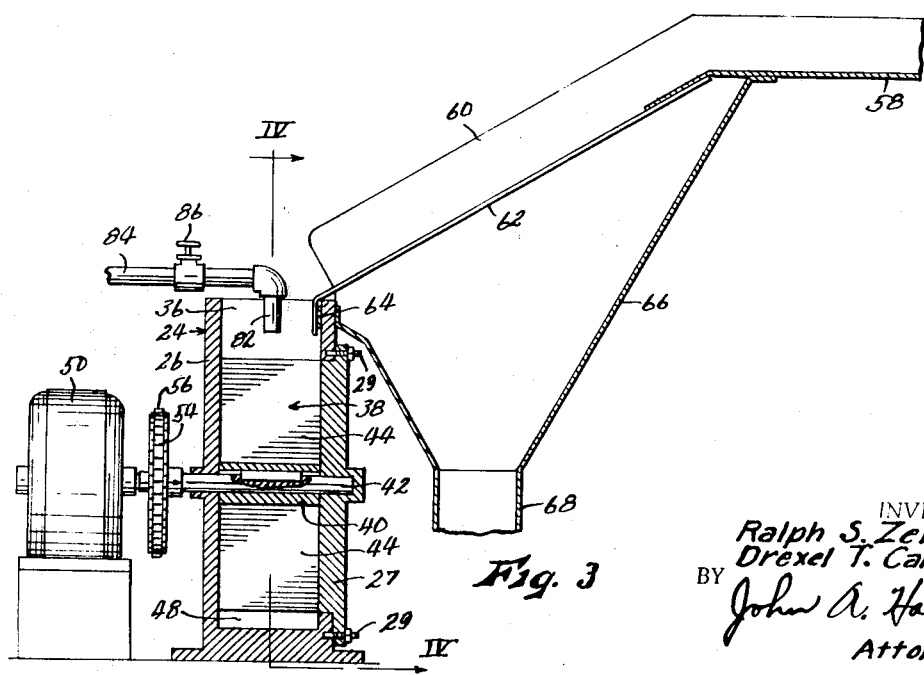

With these objects in view, as well as other objects which will appear in the course of the specification, reference will be had to the accompanying drawing, wherein:

FIG. 1 is a partially schematic side elevational view of a poultry giblet conveyor system embodying the present invention, with parts broken away, FIG. 2 is a fragmentary top plan view of the system as shown in FIG. 1, FIG. 3 is an enlarged fragmentary sectional view taken on line III—III of FIG. 1, FIG. 4 is an enlarged fragmentary sectional view taken on line IV—IV of FIG. 3, FIG. 5 is a fragmentary view similar to FIG. 4, but showing a slightly modified construction, FIG. 6 is a fragmentary sectional view taken on line VI—VI of FIG. 5, FIG. 7 is a view similar to FIG. 5, but showing still another modification of construction, and FIG. 8 is a fragmentary sectional view taken on line VIII—VIII of FIG. 7.

Like reference numerals apply to similar parts throughout the several views, and the numeral 2 applies generally to a tubular pneumatic conduit, which is formed of sheet metal, preferably stainless steel or the like. Also, though not illustrated, said conduit may be formed of demountable sections for easy inspection and cleaning. The inlet end of said conduit is connected to the outlet of an air blower 4 driven by an electric motor 6. The intake side of the blower is connected to an air chest 8, the open end of which is closed by an air filter 10, whereby only clean filtered air can enter the system. Also, the filter can be placed above or outside of the plant building, so as to avoid the entry into conduit 2 of possibly contaminating vapors present inside the building. From the blower, conduit 2 includes in sequence a horizontal leg 12, a downward leg 14, a horizontal leg 16, and upward leg 18, a horizontal leg 20, and a downward leg 22 open at its lower end. Legs 12 and 20 may be of any desired length, and need not be straight. They may conveniently be mounted or hung directly beneath the ceiling of the building, where space therefor is usually easily available.

Interposed in horizontal leg 16 of the conduit, which is of course disposed at a lower elevation than the adjoining portions of the conduit, is an air lock designated generally by the numeral 24, and by means of which giblets may be fed into conduit 2 without permitting air to escape from said conduit. As shown, said air lock comprises a generally cylindrical housing 26 with its axis horizontal and transverse to the conduit. Said housing is provided with aligned inlet and outlet passages 28 and 30 connected to the respective ends of conduit 2 as at 32 and 34, said inlet and outlet passages being generally tangential to the housing, and a top giblet feeder throat 36 opening into the interior of the housing. Mounted coaxially in said housing is a rotor 38 consisting of a hub 40 fixed on a shaft 42 which is rotatably mounted axially in the housing, and a series of vanes 44 extending radially from said hub, the outer ends of said vanes resting in sliding contact with the interior cylindrical wall of the housing, and the radial edges of said vanes having sliding contact with the end walls of the housing. One end wall 27 of the housing is removable, being releasably secured by studs 29 (see FIG. 3), in order to provide for visual inspection and cleaning of the interior of the housing. Vanes 44 divide the interior of the housing into a series of segmental chambers 46. None of these chambers can be connected simultaneously with feeder throat 36 and either of air passages 28 or 30 thereof, since the angular extent of the housing between throat 36 and passages 28 and 30 is greater than the angle between successive vanes 44. Therefore the rotor acts as a seal preventing air in conduit 2 from escaping through throat 36. Housing 26 provides an air passage 48 between inlet 28 and 30, so that rotor 38 does not obstruct the flow of air in conduit 2.

It will therefore be seen that poultry giblets dropped into feeder throat 36 will enter one of chambers 46 of the rotor, and if the rotor is then turned, will be deposited in conduit 2. The rotor is turned by an electric motor 50, a sprocket 52 on the driveshaft thereof being operably connected by means of sprocket chain 54 to a sprocket fixed on an end of rotor shaft 42 extended outwardly from housing 26. A rotary speed of about 20 r.p.m. has been found satisfactory.

Giblets harvested from the poultry carcasses, usually on the evisceration line, may be deposited in a shallow trough 58, along which they are conveyed by flowing water to enter the feed throat 36 of the air lock. However, the water in trough 58 is nearly always more or less thoroughly fouled by blood and other body fluids of the birds, as well as by remnants of skin and the like, and for the sake of sanitation should not be allowed to enter the conveyor system. To this end, trough 58 is provided with a downwardly inclined section 60 opening at its lower end into throat 36, the floor of the inclined section being formed of longitudinally extending, spaced apart rods 62 between which water may drain, and along which the giblets will slide by gravity. The lower ends of rods 62 are turned vertically downwardly into throat 36, and are stabilized by being welded or otherwise affixed to a bar 64 which rests against the side of said throat. Beneath rods 62, the trough forms a hopper 66 connected to a conduit 68 for disposal of the water draining between said rods.

The discharge end of conduit 2 discharges into an inclined trough 70 similar to trough 60, having a floor formed of spaced apart rods 72, and forming a hopper 74 beneath said floor connected to a disposal conduit 76. Trough 70 discharges the giblets, as shown in the drawing, into a tank 78 filled with iced water or other chilling fluid 80, although it will be understood that the conveyor system per se ends with trough 70, and that said trough may discharge the giblets at any desired station preparatory to any desired operation. In the species of the invention shown in FIGS. 1–4, clean fresh water is added directly to throat 36 of the air lock through a spout 82 connected to a water supply pipe 84, the rate of water addition being controlled by a valve 86 in said supply pipe.

In operation, with motor 6 energized to blow filtered air through conduit 2, and with motor 50 energized to turn rotor 38 of air lock 24, giblets are flowed through troughs 58 and 60 into throat 36 of the air lock, the water of trough 58, which as described above is usually fouled with blood and other body fluids, as well as bits of skin, entrails and the like, being drained out between rods 62 forming the floor of trough 60 and disposed of through hopper 66 and conduit 68. The drained giblets are thus inserted into the air lock together with clean water from spout 82, entering any one of the chambers 46 of rotor 38 formed by vanes 44, and being transported thereby and deposited in the lower portion of housing 26, from whence they move into the depressed leg 16 of conduit 2. The giblets are not at first driven through the conduit by the air, since the giblets and added water do not at first fill the conduit, but gather in the lower portion thereof, so that the air can flow thereover. Water of course cannot then flow backwardly through the conduit to blower 4, due to the vertical leg 14 of the conduit, nor forwardly, due to the vertical leg 18 of the conduit. However, as more and more giblets and water are added, the lower horizontal leg 16 of the conduit is gradually completely filled, so that said water and giblets form a seal over the entire cross-sectional area of the conduit. Since the air cannot then flow past this seal, the entire mass of water and giblets ahead of the point of sealing is driven ahead of the air through the conduit to the discharge end thereof. Water and giblets of course immediately start to fill conduit section 16 again, so that the process is repeated cyclically, the water and giblets moving through the conduit in a series of spaced apart "slugs," the discharge from the conduit being of an intermittent or "pulsing" nature. The rate at which water is added to the air lock by spout 82 depends on the rate at which giblets are being added, and should be adjusted so that there is sufficient water in each "slug" blown through the conduit, in proportion to the amount of giblets, that the giblets are well suspended in water and will not rub or wipe against the conduit walls with any appreciable force, such rubbing action being capable of damaging the fragile giblets. A sufficiently large proportion of water will also aid in the washing of the giblets which is accomplished by the tumbling and agitation of the giblets and water as they progress through the conduit. As the water and giblets are discharged into trough 70, the water is again drained away between rods 72 into hopper 74 and disposal conduit 76, so that the giblets finally emerging from trough 70 are thoroughly washed and drained, in order to be fully prepared for the next step in the processing thereof.

Referring to FIG. 4, it will be seen that as giblets fall through throat 36 of the air lock, a small percentage of them may fall across and be lodged on the outer ends of vanes 44, as said vanes traverse said throat, and that giblets so disposed may be cut or sliced between said vane and the air lock housing when said vane contacts point 88 of said housing. To avoid this damage to the giblets, modifications of structure have been shown in FIGS. 5–8.

In FIGS. 5 and 6, a soft, resilient flap 90 is disposed at one side of throat 36, said flap being secured to housing 26 as by rivets 92, and having its free end portion extending toward the rotor 38, radially thereto, to a point closely adjacent the orbit of the outer ends of the rotor vanes. Behind the flap, the rotor housing is offset outwardly as indicated at 94 to provide room for movement of said flap. If giblets lodge at the end of any vane, they will be swept therefrom by said flap, before said vane engages the rotor housing at point 96. In this species, fresh water is still added by water pipe 84 and spout 82, as in FIGS. 1–4, and the operation is otherwise the same as that of the species of FIGS. 1–4.

In FIGS. 7 and 8, a series of water nozzles 98 are fixed in the air lock housing at one side of throat 36, said nozzles being spaced apart laterally of said throat and being adapted to direct jets or sprays of water across said throat, in substantially tangential relation to rotor 38, as shown. Said water jets function to dislodge from vanes 44 any giblets which may have fallen thereacross, before said vane engages the housing at point 100. Externally of the housing, nozzles 98 are connected to a common header pipe 102, to which fresh water is supplied through a regulating valve 104. The water furnished by nozzles 98 not only sweeps giblets from the rotor vanes 44, but also serves as the fresh water supply for activating the conveyor, so that this species of the invention requires no water adding spouts 82 as shown in FIGS. 4 and 5. In all other respects, the operation of this species is identical to that of the species is identical to that of the species shown in FIGS. 1–4.

While we have shown and described a specific embodiment of our invention, it will be readily apparent that many minor changes of structure and operation could be made without departing from the spirit of the invention as defined by the scope of the appended claims.

What we claim as new and desire to protect by letters Patent is:

1. A poultry giblet conveyor system comprising:
   (a) an elongated tubular conduit having one portion thereof disposed lower than the adjoining portions thereof, and an opening in said one portion for the insertion of giblets into said conduit,
   (b) blower means interconnected to one end of said conduit and operable to force a current of air therethrough,
   (c) air lock means in said conduit opening operable to permit the entry of giblets and water through said opening but to prevent the escape of air therethrough, and
   (d) means for delivering giblets together with a supply of water to said conduit opening.

2. A poultry giblet conveyor system as recited in claim 1 wherein said air lock means comprises:
   (a) a housing having inlet and outlet openings connected in said conduit and a throat inlet for giblets, said throat inlet being spaced apart from said inlet and outlet openings,
   (b) a rotor mounted for rotation in said housing so as to seal said inlet throat from said inlet and outlet openings but not to seal said inlet opening from said outlet opening, said rotor having a series of chambers formed therein each operable as said rotor is rotated to be connected alternately with said inlet throat and said inlet and outlet openings, and
   (c) means operable to rotate said rotor.

3. A poultry giblet conveyor system as recited in claim 1 wherein said blower means consitutes a blower housing having air inlet and outlet openings, and is operable to draw air through said inlet opening into said housing and to deliver it under pressure to said outlet opening, said outlet opening being interconnected to said conduit, and with the addition of an air filter obstructing said air inlet opening whereby to filter the air entering said housing.

4. A poultry giblet conveyor system as recited in claim 2 wherein said giblet inlet throat of said air lock housing opens upwardly, and wherein said means for delivering giblets to said conduit comprises a downwardly inclined trough opening at its lower end into said throat, and through which giblets may pass by gravity, the floor of said trough being formed of spaced apart members between which fluids may drain from said giblets.

5. A poultry giblet conveyor system as recited in claim 1 with the addition of:
   (a) an inclined trough positioned to receive in the upper end portion thereof the water and giblets emerging from the discharge end of said conduit, and through which said giblets may pass by gravity, the floor of said trough being formed of spaced apart members between which water may drain from said giblets.

6. A poultry giblet conveyor system as recited in claim 2 wherein said giblet inlet throat of said air lock housing opens upwardly, and wherein said means for delivering giblets to said conduit comprises a downwardly inclined first trough opening at its lower end into said throat, and through which giblets may pass by gravity, the floor of said first trough being formed of spaced apart members between which fluids may drain from said giblets, and with the addition of:
   (a) an inclined second trough positioned to receive in the upper end portion thereof the water and giblets emerging from the discharge end of said conduit, and through which giblets may pass by gravity, the floor of said second trough being formed of spaced apart members between which water may drain from said giblets.

7. A poultry giblet conveyor system as recited in claim 2 wherein said means for delivering water to said conduit comprises:
   (a) a spout directed downwardly into said throat and connected to a water supply line, and
   (b) means for regulating the rate of flow of water through said spout.

8. A poultry giblet conveyor system as recited in claim 2 wherein said air lock housing is generally cylindrical with a horizontal axis and with said giblet inlet throat opening upwardly therefrom, and wherein said rotor has generally radial vanes having sliding contact with the cylindrical and end walls of said housing, the outer ends of said vanes traversing said throat as the rotor is turned, and with the addition of:
   (a) a flexible flap secured in the side of said throat toward which said vanes move and having a free end portion extending to a point closely adjacent the orbit of the outer ends of said vanes.

9. A poultry giblet conveyor system as recited in claim 2 wherein said air lock housing is generally cylindrical with a horizontal axis and with said giblet inlet throat opening upwardly therefrom and wherein said rotor has generally radial vanes having sliding contact with the cylindrical and end walls of said housing, the outer ends of said vanes traversing said throat as the rotor is turned, and wherein said means for supplying water to said conduit comprises:
   (a) a nozzle mounted in said housing throat at the side thereof toward which said vanes move and operable to direct a water jet across said throat generally tangential to the orbit of the outer ends of said vanes, and opposite to the direction of movement of said vanes.

References Cited
UNITED STATES PATENTS

| | | | |
|---|---|---|---|
| 1,512,561 | 10/1924 | Oliphant | 302—14 |
| 1,879,085 | 9/1932 | Chapman | 302—14 |
| 2,666,671 | 1/1954 | Kimmerle | 302—14 |

ANDRES H. NIELSEN, *Primary Examiner.*